United States Patent
Agrawal et al.

(10) Patent No.: US 6,370,526 B1
(45) Date of Patent: Apr. 9, 2002

(54) SELF-ADAPTIVE METHOD AND SYSTEM FOR PROVIDING A USER-PREFERRED RANKING ORDER OF OBJECT SETS

(75) Inventors: Rakesh Agrawal, San Jose, CA (US); Andreas Arning, Rottenburg; Roland Seiffert, Herrenberg, both of (DE); Ramakrishnan Srikant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,479

(22) Filed: May 18, 1999

(51) Int. Cl.⁷ .............................................. G06F 17/30
(52) U.S. Cl. ............................................................ 707/5
(58) Field of Search ............................................. 707/5

(56) References Cited

U.S. PATENT DOCUMENTS 5,943,670 A * 8/1999 Prager ............................ 707/5
6,078,916 A * 6/2000 Culliss ............................ 707/5
6,161,130 A * 12/2000 Horvitz et al. ............... 709/206

* cited by examiner

Primary Examiner—John Breene
Assistant Examiner—Susan Rayyan
(74) Attorney, Agent, or Firm—Driggs, Lucas, Brubaker & Hogg

(57) ABSTRACT

A method and system for presenting a group of objects in a ranking order. Objects are ranked according to user preferences by first observing the access order of a related group of objects in relation to a predetermined access hypothesis. A user preference model is then adapted to correspond to any deviations between the access order and the access hypothesis for the related group of objects. Next, object preferences are calculated for each of the objects to be ranked according to the preference model. The group of objects is then presented to the user in an order corresponding to the calculated object preferences. The preference model is adaptively updated, unbeknownst to the user, in the normal course of accessing the presented objects.

30 Claims, 1 Drawing Sheet

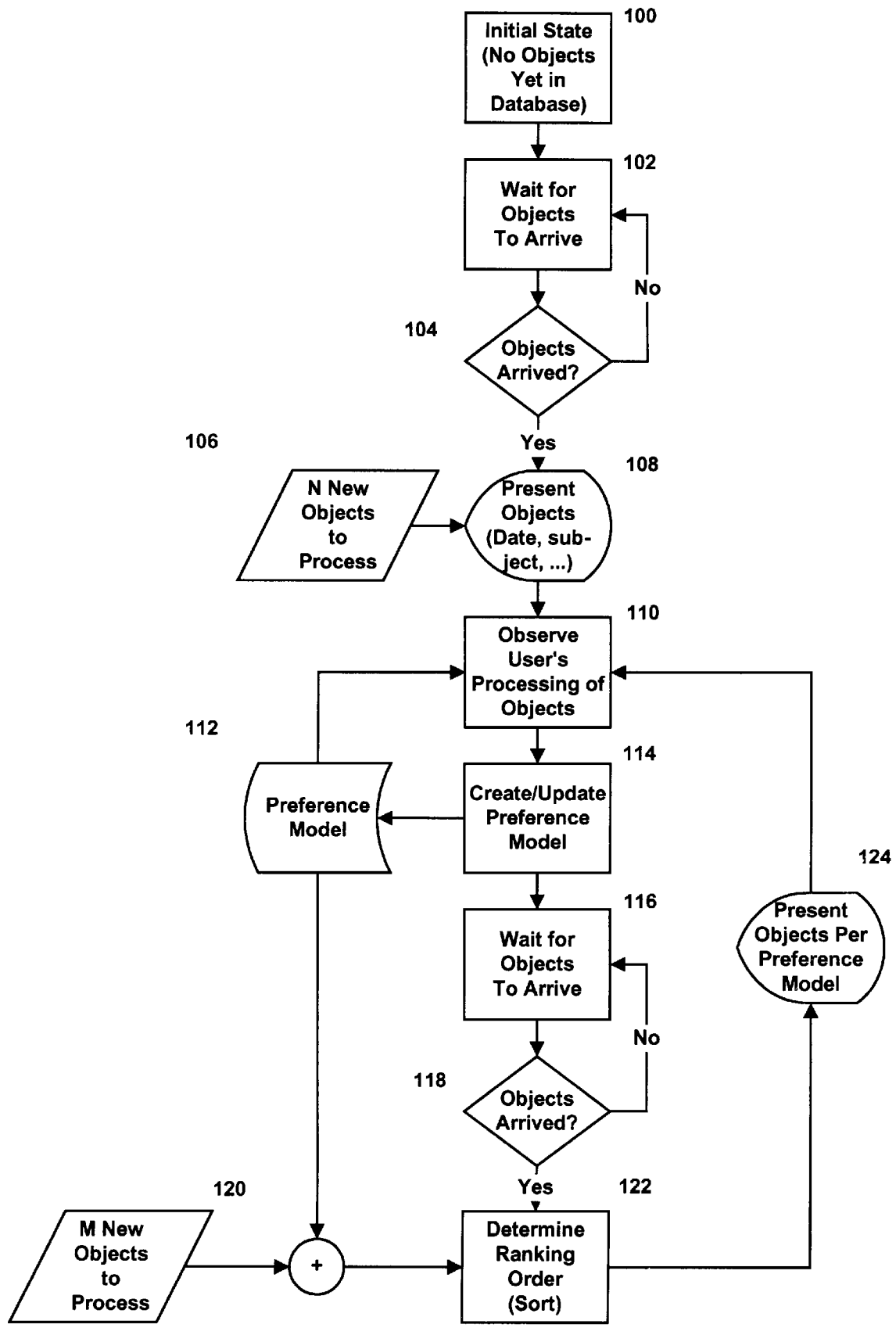

SELF-ADAPTIVE METHOD AND SYSTEM FOR PROVIDING A USER-PREFERRED RANKING ORDER OF OBJECT SETS

TECHNICAL FIELD

The present invention relates to a method and apparatus for presenting a plurality of objects in a ranking order according to a user's preferences with respect to those objects.

BACKGROUND ART

Society is experiencing explosive growth in the amount of information available through electronic media. The challenges raised by this growth are many, however, one of the most significant, if not the most significant challenge faced by the information technology industry is being able to process, organize and present this mass of information to users in an efficient manner. In most cases it is possible to treat the information as arbitrary types of objects, i.e., objects of related data treated as a unit. Examples of these types of objects include electronic mail messages within an e-mail system, documents in a document organization system, the results of a list of documents returned by a search engine or perhaps the information retrieved as a result of queries processed against a database.

Attempts have been made to address this challenge by presenting the set of objects, not in an arbitrary order, but instead in an order allowing a potential user to concentrate on "more important" objects while skimming through, or perhaps even neglecting, the "less important" objects.

Various technologies have been proposed for the classification and ranking of objects. For instance the concept of an urgency flag as utilized in present day e-mail systems is well known. An urgency flag is an indication attached to an object representing the importance of that object for the addressee. A disadvantage of this approach is that the degree of urgency is determined solely by the author, thus ignoring the importance that a reader/addressee may attach to the information. "Junk" mail would be an example where the degrees of urgency between sender and receiver could vary greatly. Moreover, this technique does not easily allow multiple recipients of the information to be treated differently with respect to the urgency of the message (perhaps only by using different mailing tasks could this flexibility be accomplished).

Another common ranking/classification technique is that used in present day search engines. Typically these engines sort a list of search "hits" based solely upon the search pattern that is entered into the engine. Because these search engines ignore user preferences that exist amongst the various objects retrieved, such ranking techniques have the disadvantage of supplying a user with "hits" that may match the search pattern, but are not within the context of the user's query.

Agent techniques are yet another commonly utilized method of preprocessing information, such as the filtering of unwanted incoming e-mail messages. Although somewhat effective, these filtering techniques have the disadvantage of requiring that the filter criteria be explicitly specified for each potential user of the information.

Sort options, such as the sorting of e-mail messages by author, subject, or other specified fields, are commonly applied in today's various systems and products. While these techniques do generally offer a rough ordering scheme, typically none of the offered sort criteria perfectly maintains a user's preferences with respect to the information being managed.

Data mining and text mining technologies exploit cluster techniques in order to segment documents into groups whose members share some common group characteristic. Again, however, the clusters typically employed in today's systems do not usually reflect a user's particular preferences with respect to the information being managed.

Another classification technique used today is that which processes information by first executing some type of training sequence on the data. An example is a system that automatically transfers received e-mail messages into predefined folders. While effective, these systems typically require a significant amount of up-front training before they can effectively process a set unknown of objects. Furthermore, this time consuming training sequence must be re-executed whenever it becomes outdated as a result of the need to process new types of information. Thus, the technique is rather inefficient and the quality of the resulting classification is limited by the robustness of the training set.

Finally, an approach for optimizing the ranking order of a set of objects based on user preferences is proposed in D. E. Rose et al., U.S. Pat. No. 5,724,567. The method disclosed compares the results of content based ranking algorithms (such as those employed in search engines) and/or collaborative filtering techniques (which are based on explicit input from other users of the information) to a user profile in order to generate the ultimate ranking order. The user profile is created using a relevance-feedback approach which requires users to enter information into the system regarding the relative importance of the information being processed. A drawback of this approach is that the resultant ranking of information is only as accurate as the feedback provided by the users of the information. Furthermore, collecting this added information requires users to explicitly enter feedback in response to system queries which detracts from the overall use of the application.

It is therefore a purpose of this invention to provide a method and apparatus for presenting a plurality of objects in a ranking order reflecting a user's preferences with respect to those objects, while easing and improving the task of describing the characteristics of the user preferences upon which the ranking order will be based.

SUMMARY OF THE INVENTION

The invention relates to a computerized method of presenting a plurality of objects in a ranking order. The objects are presented in a ranked order according to a calculated object preference. Object preferences are determined using a preference model that is based upon a user's access actions to a group of objects. This preference model is adaptively developed using the information resources associated with a user's normal interaction with the group of objects being ranked. Because the information gathered regarding object preferences is implicit to normal user activities, the adaptive development of the preference model and continual recalculation of object preferences is completely transparent to the user.

This approach offers advantages in productivity and ease-of-use over methods that require users to explicitly enter ranking information into the system during a so-called training phase. These types of applications, such as the collaborative filtering method discussed above, can often require users to invest more time and effort in training than the benefit they can expect to receive in the form of object organization. Moreover, the proposed method utilizes the most reliable information available to determine a user's preferences with respect to a group of objects, namely, the user's own access patterns to that particular set of objects.

Reliance on a user's opinion of the "importance" of an object as opposed to their "preference" for that object, as determined through actual patterns of use, often leads to misleading results. For example, an "out-of-the-office" message may certainly be important at the time of receipt, however, an analysis of the user's access patterns would likely yield that their preference for accessing this type of information is actually quite low. In addition, using implicit information resources can yield preferences for certain types of objects that a user may not even be aware exist. Such preferences would be ignored in a system relying solely on explicit importance scores to determine object preferences, thus exemplifying the advantages of the proposed method and apparatus.

BRIEF DESCRIPTION OF THE DRAWING

The foregoing and other purposes, aspects and advantages of the invention will be better understood from the following detailed description with reference to the drawing, in which a general flow chart of a preferred embodiment of the invention is shown.

DETAILED DESCRIPTION OF THE PREFERRED EMBODIMENT

The description of the present invention uses the term "object" in its most general meaning, namely that of representing any related data that is treated as a unit. The terms "object" and "document" are used interchangeably throughout the specification. Also, the present invention is being described in the context of objects that are electronic mail messages (e-mail) within an e-mail system for purposes of illustration only. Those skilled in the art will appreciate that the proposed invention is applicable to any other object system without limitation.

Moreover, the term "user" is not necessarily limited to a human user, although this often will be the case. Indeed, the proposed method could also be applied to a group of users, or perhaps to an automated user. In addition, while the proposed method focuses on the use of implicit user information, this type of information could be used in combination with explicit user preference feedback in order to provide the capability of explicitly forcing changes to a user's object preference model.

Introduction to the Underlying Technology

It is has been observed that users resist using ranking technologies that require explicit entry of object preference feedback information in order to "train" their database systems. Furthermore, the most reliable source of information for determining object preference is the manner in which a user accesses a group of objects, not the user's own opinion of the importance the objects within a particular group. Thus, there exists a need in today's document management systems for sorting functions that are capable of operating on implicit, rather than explicit, object preference information resources.

To this end, the method and apparatus of the preferred embodiment requires that no additional explicit information be entered by a user in order to determine a user's preference with respect to a group of objects. Instead, implicit user information is derived from the actual handling and processing of information objects in order to develop a user preference model with respect to those objects. In particular, the order in which a user processes a group of documents is utilized. By keeping track of this order, an internal model can be constructed which represents the preferences of a user for a particular group of objects (referred to as the preference model). Over time, the system can adapt to the user's object preferences and will present newly received objects in a ranking order that is determined by the adaptive preference model.

To monitor the order in which a user processes a list of documents, one can measure the deviation between the expected/presented order (known as the access hypothesis) and the actual order in which the document was accessed by the user. A number can be computed to represent this deviation which can then be tested in order to determine whether a particular document is more or less attractive to the user. For example, a system could be designed such that the greater the measured deviation between the actual and expected order position, the more attractive the document is deemed to be to the user. Thus, positive differences would represent attractive documents, negative differences unattractive documents and a document having a difference of zero would be deemed to be of neutral interest.

By using a classification algorithm such as a naive Bayesian classifier, a system could learn to estimate the access hypothesis from the various attributes of the document. That is to say, any part of an object's contents can be utilized as the characteristic feature upon which the user's preference could be based. In the case of e-mail messages, these attributes can be the author's name, the length of the document, the age of the document, the persons listed in the to-list and/or cc-list, the length of the to-list and/or cc-list, the position of a user's name in the to-list and/or cc-list, a list of words occurring in a document using counts or in combination with a "stop-word-list" (i.e. a list of words to be ignored) or perhaps the language of the document itself. Any number of combinations are possible. In addition, weighting factors can be used to increase or decrease the emphasis placed on certain attributes (e.g. to place a higher emphasis on the "subject line" of an e-mail message) in the ranking.

Once the algorithm has associated the features or attributes of a document to a number representing its "attractiveness" to the user, the algorithm can then reproduce this number for newly received like documents as well as predict an attractiveness for never-before-seen documents. Upon computing an attractiveness for a set of received documents, the order of the documents can be rearranged and presented to the user with documents having the highest value of attractiveness listed first. Assuming that the observable attributes of a document are in some way related to its attractiveness, what will result is a group of documents being presented to a user in an improved sort order, having the most attractive documents listed first according to a preference model that is based upon that user's specific patterns of document use.

This methodology can be applied iteratively to the documents within a group to be ordered, wherein after each iteration a modified sort order is recalculated by the algorithm, such that changes in the underlying preference model can be supported and such that the effect of over-fitting the data can be avoided.

Referring to the drawing, the following describes the various phases executed by the proposed ranking methodology of the preferred embodiment.

1. The Initial State

The system is ready to start from scratch 100.

2. Present First Set of Documents

After detecting new documents have arrived 102–104, N new documents 106 are presented 108 in the usual state-of-the-art fashion, such as being ordered by date, arrival time, author, . . .

3. Observation of the User's Selections

The system keeps track of how the users deviates from the presented order 110 by monitoring the user's selections. The system calculates the deviation between an object's actual access order and its corresponding access hypothesis as determined by the current preference model 112.

4. Creation of the Preference Model

A model 112 reflecting the user's preferences is constructed 114 based upon key features of the selected documents.

5. Wait for Further Documents to Arrive

The system waits until new documents have arrived to be presented 116–118.

6. Computation of the Assumed Sort Order

Each new document in the group is assigned a value 122 according to the preference model 114. The M new documents received 120 are then sorted according to the computed value 122 and displayed to the user in order of preference 124.

7. Observation of the User's Selections.

Once again, the system monitors 110 how the user's preferences differ from the order predicted by the preference model 112.

8. Update of the Preferences Model

The preference model 112 is then updated 114 based upon these observed deviations.

9. Continual Update of the Preference Model

The preference model is continually adaptively updated by the system as new documents are received, ordered, presented and then subsequently processed by the user.

AN ILLUSTRATIVE EXAMPLE

To better illustrate the operation of the invention, an example is presented in which incoming mail messages in an electronic mail system are processed using the method of the preferred embodiment. For ease of understanding, the number of mail messages presented in the example has been kept purposefully small, however, the skilled reader will appreciate that the larger the number of messages processed by the system, the more accurate the adaptive preference model will become. Also, the example illustrates the use of a simplified method of classifying documents in which the words appearing in the document are monitored. However, the skilled reader will appreciate that any suitable Bayesian or non-Bayesian classification could be used with equal effect.

Phase 1: Initial State

Again for ease of understanding, all messages except those which remain unread are ignored in the example. For the purposes of this example, it is further assumed that only two unread e-mail messages reside initially in the user's "inbox".

Phase 2: Present First Set of Documents

Initially, the e-mail messages are ordered using traditional sorting techniques. In this case, the messages may be sorted by date of arrival, however, any other sorting criteria could be used. Following this initial sorting, the messages appear in the user's inbox as follows:

| Mail #: | Who: | Subject: |
|---|---|---|
| 1 | Company CEO | Our Challenges for 1999 |
| 2 | Dept Manager | Salary increased |

Again for the sake of simplicity, the body of the e-mail messages will be kept relatively short and simple. The information contained in the two initial e-mail messages is given as:

Mail 1

Last quarter the revenues were good again, keep on going ahead!

Mail 2

Due to good revenues, all the salaries were increased.

Phase 3: Observation of the User's Selections

Next it is observed by the system that the user chooses to open the second e-mail message (referred to as "D2" for document number two) before opening the first message (referred to as "D1" for document number one). Bonus and penalty values are then assigned based on the order in which the documents are read. For now, assume that D1 is assigned a penalty value of −1 and that D2 is assigned a bonus value of +1. Several ways in which penalty and bonus values may be assigned are discussed below. Phase 4: Creation of the Preferences Model In the creation of the preference model, it is recommended that all available features of the object to be sorted be utilized as sort criteria. The reader is referred to the many possible characteristics that may be utilized in the case of sorting e-mail messages as was described above. Although a subset of features could be used to determine object preferences, a system in which the entire document contents are used as features will result in most robust preference model.

This simple example uses a lower case mapping of the words contained in the document as the sorting features. Thus, for each of the documents D1 and D2, the following feature lists result:

List of Words in D1
last
quarter
the
revenues
were
good
again
keep
on
going
ahead List of Words in D2
due
to
good
revenues
all
the
salaries
were
increased Merging the two lists together and marking each unique word by its list origin (D1 or D2), the following composite feature vector of the preference model results:

| | | |
|---|---|---|
| again | D1 | |
| ahead | D1 | |
| all | | D2 |
| due | | D2 |
| going | D1 | |
| good | D1 | D2 |
| increased | | D2 |
| keep | D1 | |
| last | D1 | |
| on | D1 | |
| quarter | D1 | |
| revenues | D1 | D2 |
| salaries | | D2 |
| the | D1 | D2 |
| to | | D2 |
| were | D1 | D2 |

Next, the bonus and penalty values assigned in phase three are used to generate weights for the different features. These weights represent the user's preference of the individual features and are generated by summing the bonus and penalty values for each entry in the feature vector. Thus:

| FEATURE | CONTRIBUTION TO VECTOR PER DOCUMENT | RESULTING PREFERENCES VECTOR |
|---|---|---|
| again | −1 = | −1 |
| ahead | −1 = | −1 |
| all | +1 = | +1 |
| due | +1 = | +1 |
| going | −1 = | −1 |
| good | −1 +1 = | 0 |
| increased | +1 = | +1 |
| keep | −1 = | −1 |
| last | −1 = | −1 |
| on | −1 = | −1 |
| quarter | −1 = | −1 |
| revenues | −1 +1 = | 0 |
| salaries | +1 = | +1 |
| the | −1 +1 = | 0 |
| to | +1 = | +1 |
| were | −1 +1 = | 0 |

The resulting vector represents the user's current preferences as determined by the system thus far. The feature vector, together with the corresponding preference values, form the user's current preference model.

Phase 5: Wait for Further Documents to Arrive

Next, it is assumed that three additional unread documents arrive in the user's inbox. In the following depiction, the previous two documents processed by the system no longer reside in the inbox (perhaps as a result of being archived or deleted), although this need not have been the case. To avoid confusion, the newly arrived documents are numbered as mail messages 3, 4, and 5.

| Mail #: | Who: | Subject: |
|---|---|---|
| 3 | David | Comments welcome |
| 4 | Dept Manager | Salary increased again |
| 5 | Administrator | Important: computer virus |

The contents of each of the messages has again been kept purposefully brief.

Mail 3

All additional comments are due until Friday.

Mail 5

Next quarter, salaries will be increased again.

Mail 5

Attention! New virus ahead!

Phase 6: Computation of the Assumed Sort Order

Using the preferences vector constructed in phase four, a feature value is assigned to the features in each of the new mail messages, resulting in an object feature vector for each object in the list to be sorted. New words, or features, not appearing in the original preference vector are assigned a value of zero. Next, the sum of the features is calculated resulting in an object preference for each message as follows:

| Mail 3: | | | | | | | | |
|---|---|---|---|---|---|---|---|---|
| | All | additional | comments | are | due | until | Friday. | |
| | +1 | 0 | 0 | 0 | +1 | 0 | 0 | sum: +2 |
| Mail 4: | | | | | | | | |
| | The | salaries | will | be | increased | again. | | |
| | 0 | +1 | 0 | 0 | +1 | −1 | | sum: +1 |
| Mail 5: | | | | | | | | |
| | Attention! | New | virus | ahead! | | | | |
| | 0 | 0 | 0 | −1 | | | | sum: −1 |

The messages are then sorted and presented to the user in descending order of object preference. Thus, in the case of the object preferences calculated above, the messages will be presented to the user in the order, D3, D4 and D5 (corresponding to documents 3, 4, and 5 respectively).

Phase 7: Observation of the User's Selection

Assume now that now the user accesses the objects in the order D5, D4, then D3. As occurred in phase three above, bonus and penalty values are assigned based on the order in which the documents are read. Assume for purposes of this example that D3 is assigned a penalty value of −2, D4 is assigned a neutral value of 0 and that D5 is assigned a bonus value of +2. Again, details on the assignment of bonus and penalty values is provided below.

Phase 8: Update of the Preferences Model

Next, the features of the new documents are merged into the existing preference feature vector constructed in phase four. This results in the following updated feature vector:

| FEATURE | SOURCE OF FEATURE | | | |
|---------|------|------|------|------|
| additional |  | D3 |  |  |
| again | D1 |  | D4 |  |
| ahead | D1 |  |  | D5 |
| all |  | D2 | D3 |  |
| are |  |  | D3 |  |
| attention |  |  |  | D5 |
| be |  |  | D4 |  |
| comments |  |  | D3 |  |
| due |  | D2 | D3 |  |
| Friday |  |  | D3 |  |
| going | D1 |  |  |  |
| good | D1 | D2 |  |  |
| increased |  | D2 |  | D4 |
| keep | D1 |  |  |  |
| last | D1 |  |  |  |
| new |  |  |  | D5 |
| next |  |  |  | D4 |
| on | D1 |  |  |  |
| quarter | D1 |  |  | D4 |
| revenues | D1 | D2 |  |  |
| salaries |  | D2 |  | D4 |
| the | D1 | D2 |  |  |
| to |  | D2 |  |  |
| until |  |  | D3 |  |
| virus |  |  |  | D5 |
| were | D1 | D2 |  |  |
| will |  |  |  | D4 |

Now the penalty/bonus factors for D3, D4, and D5 (−2, 0, and 2) assigned in phase seven and the penalty/bonus factors for D1 and D2 (+1, −1) assigned in phase three are inserted into the updated feature vector. The resulting preference feature vector, with associated accumulated preference feature values, now represents the user's updated preference model.

| FEATURE | CONTRIBUTION TO WEIGHT PER DOCUMENT | | | | RESULTING PREFERENCES VECTOR |
|---------|------|------|------|------|------|
| additional |  | −2 = |  |  | −2 |
| again | −1 |  | 0 = |  | −1 |
| ahead | −1 |  |  | +2 = | +1 |
| all |  | +1 | −2 = |  | −1 |
| are |  |  | −2 = |  | −2 |
| attention |  |  |  | +2 = | +2 |
| be |  |  | 0 = |  | 0 |
| comments |  |  | −2 = |  | −2 |
| due |  | +1 | −2 = |  | −1 |
| Friday |  |  | −2 = |  | −2 |
| going | −1 = |  |  |  | −1 |
| good | −1 | +1 = |  |  | 0 |
| increased |  | +1 |  | 0 = | +1 |
| keep | −1 = |  |  |  | −1 |
| last | −1 = |  |  |  | −1 |
| new |  |  |  | +2 = | +2 |
| next |  |  | 0 = |  | 0 |
| on | −1 = |  |  |  | −1 |
| quarter | −1 |  | 0 = |  | −1 |
| revenues | −1 | +1 = |  |  | 0 |
| salaries |  | +1 |  | 0 = | +1 |
| the | −1 | +1 = |  |  | 0 |
| to |  | +1 = |  |  | +1 |
| until |  |  | −2 = |  | −2 |
| virus |  |  |  | +2 = | +2 |
| were | −1 | +1 = |  |  | 0 |
| will |  |  |  | 0 = | 0 |

In the above example, the features contained in objects participating in the object preference calculation for the first time were given equal weighting to those features contained in objects for which an object preference had already been calculated. This need not be the case, as several options are available within the scope of the invention to differentiate between new an old objects in the preference model calculation.

As one option, if one is interested in producing a preference model in which recent documents are more influential than older documents, one could multiply the penalties for the older documents (D1 and D2 in our example) by an "aging" factor F, such that $0<=F<1$. Another option would be to multiply objects participating in the preference calculation for the $P^{th}$ time by an aging factor of $F^P$, or perhaps by an aging function F(P) that is dependent upon the object's preference value and the number of times, P, the object has participated in the recalculation.

This second approach has the beneficial effect of producing object preferences that decrease the more times an object is included in the recalculation, without affecting the user's overall preference model. This behavior is desirable in situations such as when a user chooses not to remove a document that has contributed to the preference model. As the user already knows the contents of the saved object, it is unlikely that he or she will find it necessary to reopen the document each time new documents are received. However, it would incorrect to simply ignore the features within the object as they do nevertheless contribute to the overall preference model. By using the proposed aging factor, the features in the saved document remain in the preference model, however, the saved object itself receives a continual decreasing object preference as more and more new documents are processed. Thus, older documents will be migrated towards the bottom of the ordered presentation.

Note also that, depending on the method chosen to discriminate between older and newer documents, one need not maintain a weighting (or aging) factor on a per document basis, but instead, could realize an aggregate weighting scheme to achieve similar results.

Phase 9: Continual Update of the Preference Model

From this point forward, the process repeats itself from phase five whenever a new set of documents is received by the system. What results is an adaptively optimized preference model which allows all documents to be presented in an order according to the user's specific preferences.

Approaches for Computing the Bonus and Penalty Values

This part of the specification provides further details on the possible methods of converting the order in which a user accesses a group of objects into bonus or penalty values for those objects. For illustration purposes, these methods are presented in the context of a slightly more complicated example in which there now exists five (5) e-mail messages in the user's inbox. These documents are arranged as follows:

| Mail #: | Who: | Subject: |
|---------|------|----------|
| 1 | Company CEO | Our Challenges for 1999 |
| 2 | Dept Manager | Salary increased |
| 3 | Help Desk | Mainframe reboot schedule |
| 4 | David | can anyone help me |
| 5 | Gina | free coffee today |

These messages may have been initially ordered by any of the traditional methods discussed above (by author, subject, date, . . . ), or perhaps by the method of the proposed invention. First, it is important to note that, should a user read his or her mail in the displayed order, all bonus/penalty values are set to zero. This results in no change occurring in the user's preference model. Second, the skilled reader will appreciate that the assignment of bonus/penalty values could depend not only on the order in which documents are read, but also upon the manner in which the documents are processed (such as deleting a document or moving a document to a folder with or without first reading that document). Although taking these methods of document processing into account could result in a more robust preference model, for simplicity sake, the following example will consider only the order in which the documents are read.

Thus, let us assume that the reader has chosen to read the e-mail messages in an order different than the order in which the documents were originally presented. The order in which the messages are read is as follows:

| Read order: | Mail #: | Who: | Subject: |
|-------------|---------|------|----------|
| 4 | 1 | Company CEO | Our Challenges for 1999 |
| 1 | 2 | Dept Manager | Salary increased |
| 5 | 3 | Help Desk | Mainframe reboot schedule |
| 3 | 4 | David | can anyone help me |
| 2 | 5 | Gina | free coffee today |

Therefore, the user has read the message entitled "Salary increased" first and the message entitled "Mainframe reboot schedule" last. The order in which the documents were read represents a measure of the "attractiveness" of the documents according to this particular user. This order of attractiveness could based upon any feature of the message, such as its subject matter or perhaps an expectation on the part of the user as to the amount of time it will take to respond to the message. By monitoring the order in which the messages are processed, the system can determine the relative attractiveness of the messages, without the need to know the reason why the user prefers some documents over others.

The advantages of such implicit preference determination over explicit means of gathering this information has been discussed in detail above.

Returning to the above example, one may thus conclude that bonuses should be calculated for messages 2, 4 and 5 and penalties assigned to messages 1 and 3. Several different methods of assigning these bonus and penalty values are now presented:

1. The bonus/penalty values may depend on the difference between the current rank and the order in which the message is read. In this approach, the ranking order of a certain object is used as the access hypothesis. Thus, for the above example, the following bonus/penalty values would result:

| Message Number: | #1 | #2 | #3 | #4 | #5 |
|-----------------|----|----|----|----|----|
| Bonus/Penalty:  | -3 | 1  | -2 | 1  | 3  |

This computation model assumes that the presented sort order has some meaning. That is to say that the model is constructed through iterative refinement.

2. The bonus/penalty values may depend on the order in which the message, is added to or subtracted from some normalized offset which serves as the access hypothesis. Thus, for the above example, assuming an access hypothesis equal to:

$$\text{offset}=[\text{SUM}(1,2,3,4,5)]/5=3,$$

the resultant bonus/penalty values would be:

| Message Number: | #1 | #2 | #3 | #4 | #5 |
|-----------------|----|----|----|----|----|
| Bonus/Penalty:  | -1 | 2  | -2 | 0  | 1  |

This approach is based on the assumption that the original ranked order has no meaning.

3. Using a bonus-only approach, a bonus may be calculated that is equal to the number of documents skipped in reading a document in the chosen order. Documents read in an order lower than their original position receive a bonus of zero. Thus, $$\text{Bonus}=\text{Max}[0, (\text{Original Order-Order Read})],$$

and applying this method to the above example produces the following results:

| Message Number: | #1 | #2 | #3 | #4 | #5 |
|-----------------|----|----|----|----|----|
| Bonus:          | 0  | 1  | 0  | 1  | 3  |

This computational model is useful in repositioning the most interesting mail messages of a group, while leaving the relative positions of the lesser interesting mail messages of the group unchanged.

4. Using a penalty-only approach, a penalty can be assigned that is equal to the number of documents preferred over a particular document according to its original presentation order. Documents read in an order higher than their position receive a penalty of zero. Thus, $$\text{Penalty}=\text{Min}[0, (\text{Original Order-Order Read})],$$

and applying this method to the above example produces the following results:

| Message Number: | #1 | #2 | #3 | #4 | #5 |
|---|---|---|---|---|---|
| Penalty: | −3 | 0 | −2 | 0 | 0 |

This computational model is useful in repositioning the least interesting mail messages of a group, while leaving the relative positions of the more interesting mail messages of the group unchanged.

Using a bonus/penalty assignment scheme similar to those described above, in combination with the remaining features of the claimed invention, results in a system that is capable of sorting a list of incoming documents according to the specific preferences of the user of those documents. Thus, after observing the user's actions with respect to the mail messages in the above example, the system would reorder these messages for the user as follows (original order provided in parenthesis):

| Mail #: | Who: | Subject: |
|---|---|---|
| 1 (2) | Dept Manager | Salary increased |
| 2 (5) | Gina | free coffee today |
| 3 (4) | David | can anyone help me |
| 4 (1) | Company CEO | Our Challenges for 1999 |
| 5 (3) | Help Desk | Mainframe reboot schedule |

The skilled reader will appreciate that other methods of computing the bonus and/or penalty values may be used in conjunction with the proposed invention, and that the various models described above could be used simultaneously or interchanged dynamically in order to produce the desired ordering of objects.

What has been described is an invention that utilizes implicit information resources concerning a user's preferences relating to a set of objects. No explicit information is required from the user in order to train the system (such as the entering of ranking values as is typically required with collaborative filtering applications). Instead, object preference information is gathered in the normal course of operation of an application, unbeknownst to the users of the application, thus providing a solution that offers improvements in productivity and ease-of-use over systems that require users to enter explicit object preference information.

Furthermore, the disclosed invention utilizes the most reliable source of information for determining object preferences. Namely, the manner in which a user accesses a group of objects. Reliance on a user's opinion (through explicit object preference feedback or collaborative filtering) of the "importance" of an object as opposed to their "preference" for that object, as determined through actual patterns of use, often leads to misleading results. Also, the use of implicit information resources can often lead to the detection of object preferences that even the user may be unaware exist. Thus, the proposed invention provides for a more reliable method of ranking objects as compared to contemporary ranking methodologies.

The advantages of the proposed methodology appear even greater when operating in an environment of ever-increasing need for efficient document processing and organization capability. For example, as the number of objects of information to be processed grows, so too does the difficulty in determining which of these objects is of most importance to the user. A common application area where this challenge exists is in the processing of electronic mail messages. Systems that can efficiently organize and prioritize mail messages in a manner that is least obtrusive to the users will be of most use in the marketplace.

Finally, the skilled reader will appreciate that the proposed invention can be extended to provide advanced functionality capabilities. For example, advanced heuristics can be factored into the sorting algorithm in the form of feature detection modules which can be used to incorporate any conceivable feature of an object into the user's preference model. In addition, explicit rules provided by a user can be utilized to both initialize a system prior to implicit adaptation of the preference model, or to provide the capability to the user of expressly altering the current preference model.

Therefore, what is claimed is:

1. A method for presenting a plurality of objects in a ranking order, the method comprising the steps of:
    observing an access order of a first plurality of objects in relation to an access hypothesis for those objects;
    adapting a preference model in response to any deviation between said access order and said access hypothesis, said preference model comprising a preference feature vector, having object features and associated preference feature values, and a plurality of object feature vectors, having object features, for corresponding objects in said second plurality of objects, and associated preference feature values;
    calculating an object preference for each of the objects of a second plurality of objects according to said preference model, wherein said second plurality of objects is related to said first plurality of objects;
    presenting said second plurality of objects in a ranking order corresponding to said calculated object preferences; and
    thereafter continually adaptively updating the preference model as each plurality of objects are observed and processed.

2. The method according to claim 1, wherein said object preferences are calculated as a function of the preference feature values of said object feature vectors.

3. The method according to claim 2, wherein said object preferences are increased for objects accessed in an order earlier than that predicted by said access hypothesis and for objects having preference features similar to said earlier accessed objects.

4. The method according to claim 3, wherein said object preferences are increased by:
    calculating a bonus value for said objects; then
    applying said bonus value to the preference feature values of said object feature vectors.

5. The method according to claim 4, wherein said bonus value relates to the difference between said access order and said access hypothesis.

6. The method according to claim 4, wherein the magnitude of said bonus value depends upon the type of access to said first plurality of objects.

7. The method according to claim 6, wherein said type of access includes at least one of reading, deleting and moving said first plurality of objects.

8. The method according to claim 2, wherein said object preferences are decreased for objects accessed in an order later than that predicted by said access hypothesis and for objects having preference features similar to said later accessed objects.

9. The method according to claim 8, wherein said object preferences are decreased by:
    calculating a penalty value for said objects; then
    applying said penalty value to the preference feature values of said object feature vectors.

10. The method according to claim 9, wherein said penalty value relates to the difference between said access order and said access hypothesis.

11. The method according to claim 9, wherein the magnitude of said penalty value depends upon the type of access to said first plurality of objects.

12. The method according to claim 11, wherein said type of access includes at least one of reading, deleting and moving said first plurality of objects.

13. The method according to claim 1, wherein said access hypothesis relates to the relative position of an object within the presentation of said first plurality of objects.

14. The method according to claim 1, wherein said access hypothesis is equal to an offset value, identical for all objects of said first plurality of objects.

15. The method according to claim 1, wherein the calculation of said access hypothesis is dynamically selectable between at least one of:
  said access hypothesis being related to the relative position of an object within the presentation of said first plurality of objects; and
  said access hypothesis being equal to an offset value, identical for all objects of said first plurality of objects.

16. The method according claim 1, wherein said first and second plurality of objects are electronic mail messages existing within an electronic messaging system.

17. The method according claim 1, wherein said first and second plurality of objects are objects retrieved from a database.

18. The method according to claim 1 wherein the preference model is adaptively updated by dynamically determining object features in the preference feature vector and in the object feature vector.

19. A computer system, comprising:
  a housing;
  a processor mounted within said housing and processing digital data;
  memory mounted within said housing for storing digital data and coupled to said processor;
  a display coupled to said processor and said memory to present information derived from digital data processed by said processor;
  a system interface coupled to said display and said processor for accessing the information presented on said display; and
  a control program stored in said memory that, when executed on said processor, generates a preference model based upon a user's access actions on a first group of objects, said objects being presented on said display and accessed through said system interface when executed on said processor, and causes a second group of related objects to be presented in a ranked order on said display based upon said preference model.

20. The system according to claim 19 wherein the control program scaling the object preferences of said first plurality of objects by an aging factor.

21. The system according to claim 20 wherein said aging factor is equal to the value $F^P$, where $0<=F<=1$ and P is equal to the number of times an object preference has been calculated for a particular one of said first plurality of object.

22. A system for presenting a plurality of objects in a ranked order, comprising:
  a housing;
  a processor mounted within said housing and processing digital data;
  memory mounted within said housing for storing digital data and coupled to said processor;
  a display coupled to said processor and said memory to present information derived from digital data processed by said processor;
  a system interface coupled to said display and said processor for accessing the information presented on said display; and
  a control program stored in said memory and accessible by said processor to direct the processing of digital data by said processor,
  said control program and said processor cooperating, when said control program is executing on said processor, in observing an access order of a first plurality of objects, presented on said display and accessed through said system interface, in relation to an access hypothesis for those objects,
  adapting a preference model, stored in said memory, in response to any deviation between said access order and said access hypothesis,
  calculating an object preference for each of the objects of a second plurality of objects according to said preference model, wherein said second plurality of objects is related to said first plurality of objects,
  presenting said second plurality of objects on said display in a ranking order corresponding to said calculated object preferences, and
  scaling the object preference of said first plurality of objects by an aging factor.

23. The system according to claim 22 wherein said aging factor is equal to the value of $F^P$, where $0<=F<=1$ and P is equal to the number of times an object preference has been calculated for a particular one of said first plurality of objects.

24. A data processing program for presenting a plurality of objects in a ranked order based upon object preferences, said program executing in a data processing system comprising software code portions for:
  observing an access order of a first plurality of objects in relation to an access hypothesis for those objects;
  scaling the object preference of said first plurality of objects by an aging factor;
  adapting a preference model in response to any deviation between said access order and said access hypothesis;
  calculating an object preference for each of the objects of a second plurality of objects according to said preference model, wherein said second plurality of objects is related to said first plurality of objects; and
  presenting said second plurality of objects in a ranking order corresponding to said calculated object preferences.

25. The program according to claim 24 wherein said aging factor is equal to the value $F^P$, where $0<=F<=1$ and P is equal to the number of times an object preference has been calculated for a particular one of said first plurality of objects.

26. An article of manufacture comprising:
  a computer usable medium, having computer readable code modules embedded therein for presenting a plurality of objects in a ranked order based upon object preference information, said computer readable code modules including
  a computer readable code module for observing an access order of a first plurality of objects in relation to an access hypothesis for those objects;

a computer readable code module for scaling the object preference of said first plurality of objects by an aging factor;

a computer readable code module for adapting a preference model in response to any deviation between said access order and said access hypothesis;

a computer readable code module for calculating an object preference for each of the objects of a second plurality of objects according to said preference model, wherein said second plurality of objects is related to said first plurality of objects; and a computer readable code module for presenting said second plurality of objects in a ranking order corresponding to said calculated object preferences.

27. The article of manufacture according to claim 26 wherein said aging factor is equal to the value $F^P$, where $0<=F<=1$ and P is equal to the number of times an object preference has been calculated for a particular one of said first plurality of objects.

28. A method for presenting a plurality of objects in a ranking order, the method comprising the steps of:

observing an access order of a first plurality of objects in relation to an access hypothesis for those objects;

adapting a preference model in response to any deviation between said access order and said access hypothesis;

scaling the object preferences of said first plurality of objects by an aging factor calculating an object preference for each of the objects of a second plurality of objects according to said preference model, wherein said second plurality of objects also includes said first plurality of objects; and presenting said second plurality of objects in a ranking order corresponding to said calculated object preferences.

29. A method for presenting a plurality of objects in a ranking order, the method comprising the steps of:

observing an access order of a first plurality of objects in relation to an access hypothesis for those objects;

adapting a preference model in response to any deviation between said access order and said access hypothesis;

calculating an object preference for each of the objects of a second plurality of objects according to said preference model, wherein said second plurality of objects includes said first plurality of objects;

presenting said second plurality of objects in a ranking order corresponding to said calculated object preferences; and scaling the object preferences of said first plurality of objects by an aging factor wherein said aging factor is equal to the value $F^P$, where $0<=F<=1$ and P is equal to the number of times an object preference has been calculated for a particular one of said first plurality of object.

30. A method for presenting a plurality of objects in a ranking order, the method comprising the steps of:

observing an access order of a first plurality of objects in relation to an access hypothesis for those objects;

adapting a preference model in response to any deviation between said access order and said access hypothesis;

calculating an object preference for each of the objects of a second plurality of objects according to said preference model, wherein said second plurality of objects includes said first plurality of objects;

presenting said second plurality of objects in a ranking order corresponding to said calculated object preferences; and scaling the object preferences of said first plurality of objects by an aging factor wherein said aging factor is equal to the value $F^P$, where $0<=F<=1$ and P is equal to the number of times an object preference has been calculated for a particular one of said first plurality of object.

* * * * *